Jan. 25, 1949. J. R. GOMERSALL 2,459,933
ELECTRIC EGG BAKER
Filed May 3, 1943 4 Sheets-Sheet 2

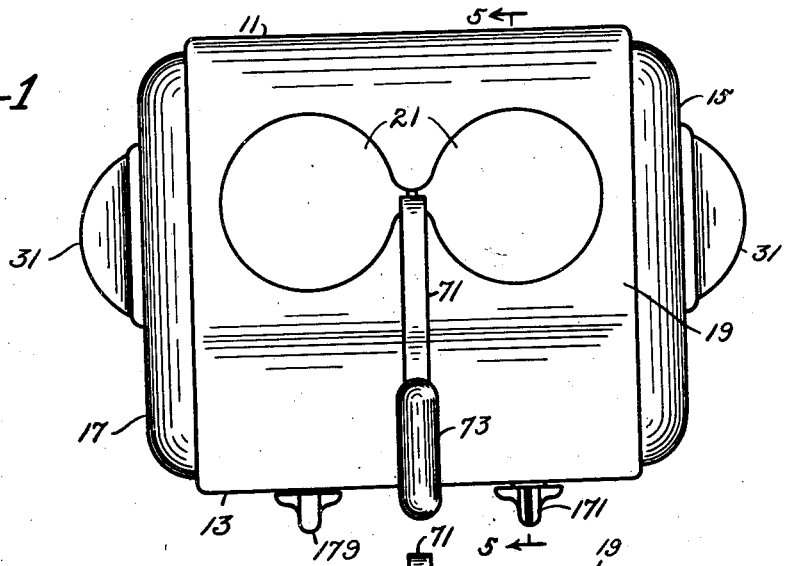
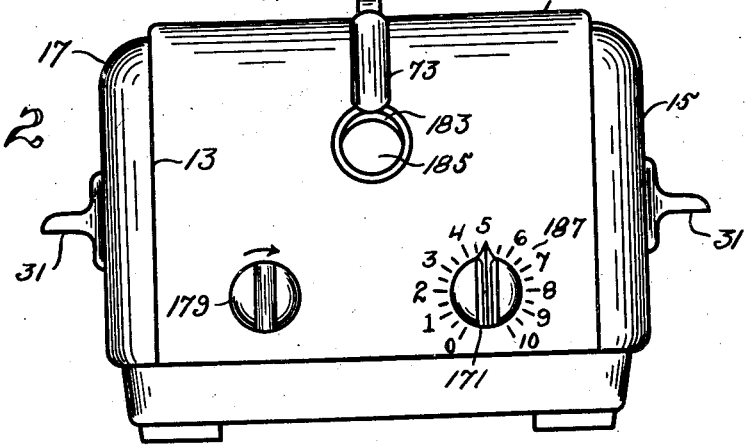
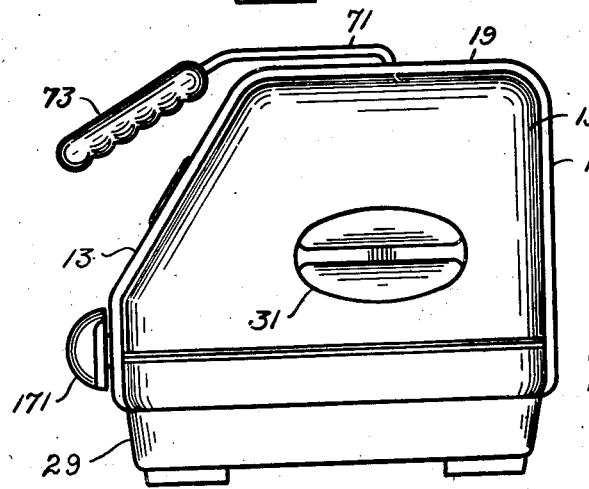

INVENTOR.
JOHN R. GOMERSALL
BY
H. M. Biebel
ATTORNEY

Jan. 25, 1949.  J. R. GOMERSALL  2,459,933
ELECTRIC EGG BAKER
Filed May 3, 1943  4 Sheets-Sheet 3

INVENTOR.
JOHN R. GOMERSALL
BY
ATTORNEY

Jan. 25, 1949.                J. R. GOMERSALL                    2,459,933
                                ELECTRIC EGG BAKER
Filed May 3, 1943                                                4 Sheets-Sheet 4
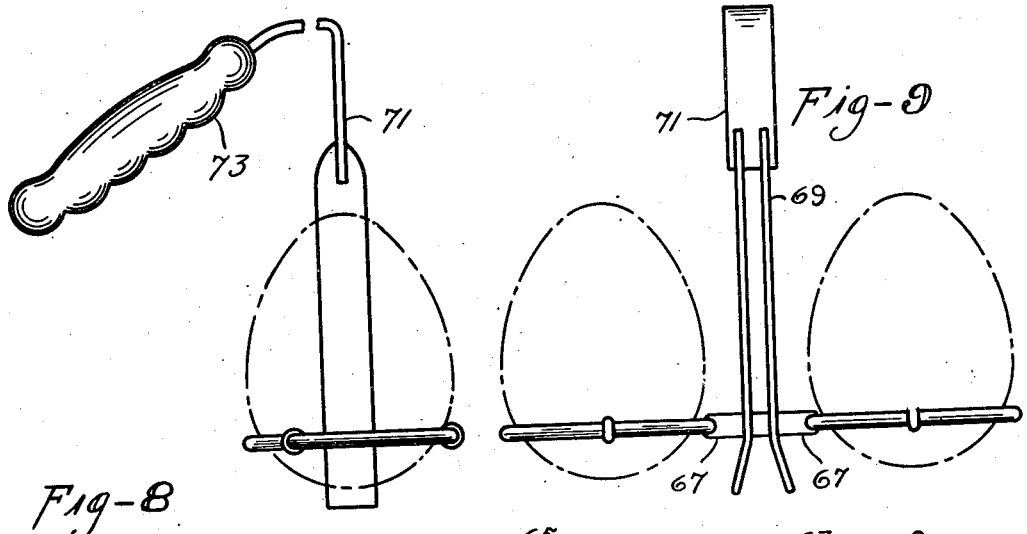
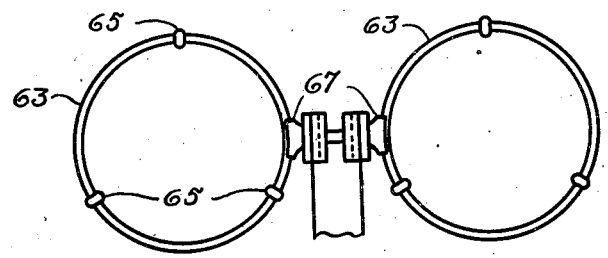
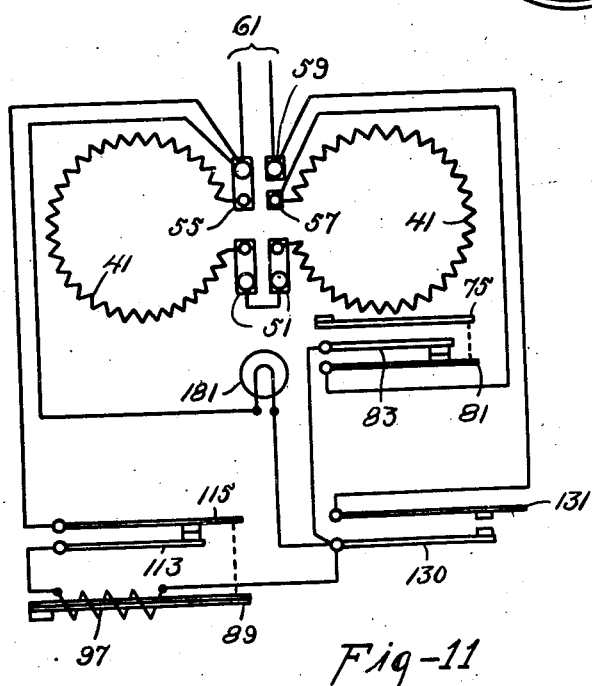
INVENTOR.
JOHN R. GOMERSALL
BY
ATTORNEY Patented Jan. 25, 1949

2,459,933

UNITED STATES PATENT OFFICE 2,459,933

ELECTRIC EGG BAKER

John R. Gomersall, Elgin, Ill., assignor to McGraw Electric Company, Elgin, Ill., a corporation of Delaware Application May 3, 1943, Serial No. 485,529

1 Claim. (Cl. 99—427)

1

My invention relates to electric cooking devices and particularly to electric egg bakers.

Among the objects of my invention are the following:

To provide a device for cooking eggs without the use of water; to provide an egg cooker or baker comprising a temperature limiting means; to provide an egg baker having an adjustable timing means operatively associated therewith; to provide a relatively simple means for holding the eggs while they are being cooked or baked.

Other objects of my invention will either be apparent from a description of a form of device embodying my invention now used by me or they will be pointed out during the course of such description and particularly set forth in the appended claim.

In the drawings,

Figure 1 is a top plan view of my new and improved egg baker,

Fig. 2 is a front elevational view thereof,

Fig. 3 is a view in end elevation thereof,

Figure 4:
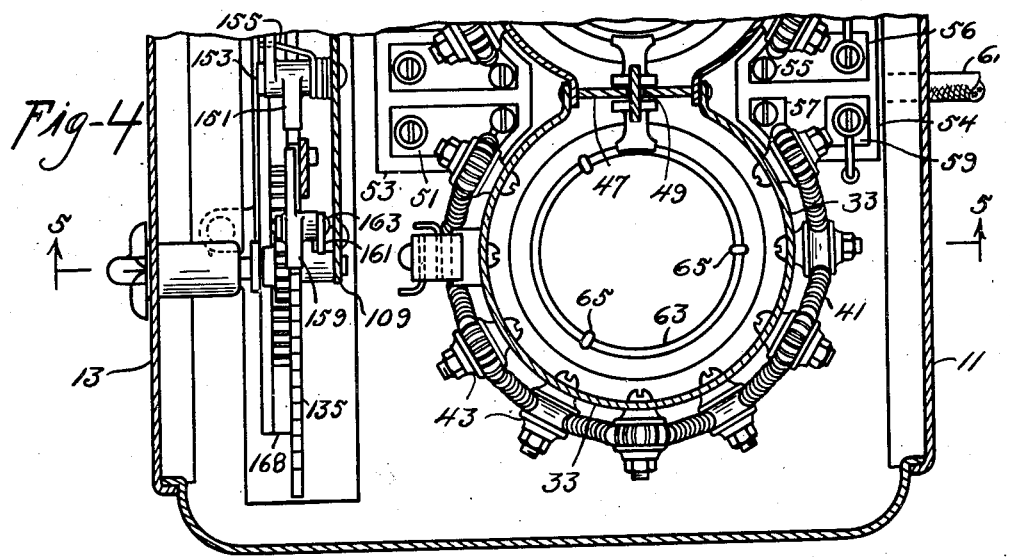
Fig. 4 is a fragmentary horizontal sectional view taken on the line 4—4 of Fig. 5 and on a larger scale than is used in Figs. 1, 2 and 3.
Figure 5:
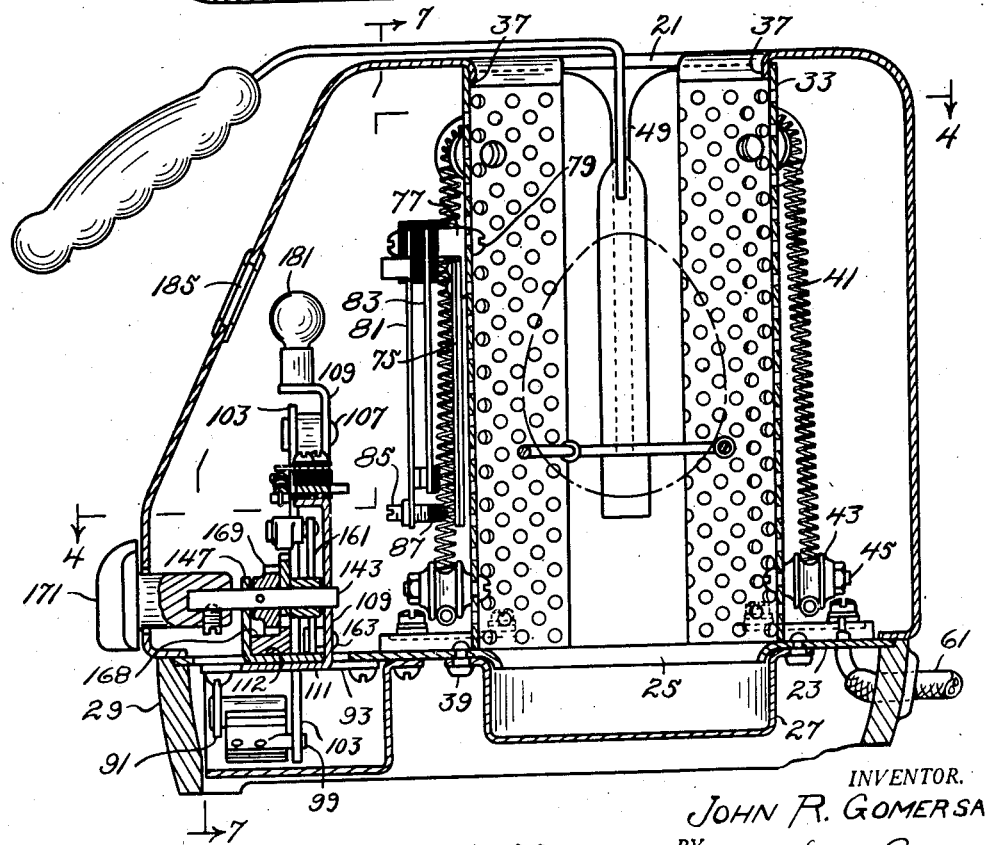
Figures 6, 7:
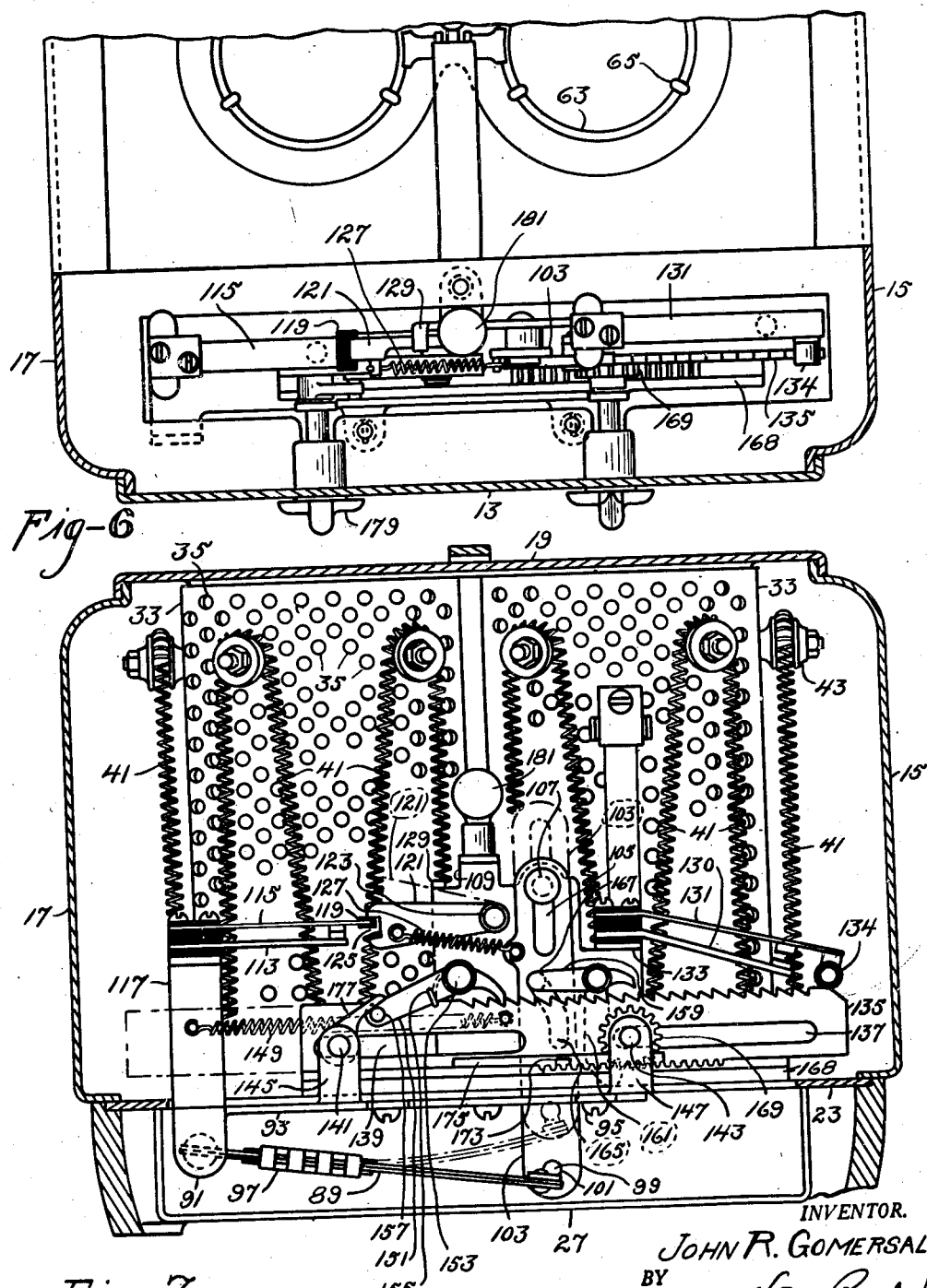

Fig. 5 is a vertical sectional view taken on the line 5—5 of Figs. 1 and 4, the scale being slightly larger than that used in Figs. 1, 2 and 3, Fig. 6 is a fragmentary top plan view of the device as shown in Fig. 7, Fig. 7 is a vertical sectional view taken on the line 7—7 of Fig. 5, Fig. 8 is a side view of my improved egg holder as shown in Fig. 5 of the drawings, Fig. 9 is a front view of the egg holder, Fig. 10 is a bottom plan view and, Fig. 11 is a diagram of the electric circuits for the egg baker.

I provide a substantially closed outer casing for my improved device comprising a rear wall 11, a front wall 13 and side walls 15 and 17 respectively. It may be here pointed out that the front and the rear walls 13 and 11 are unitary with a top wall 19, the top wall being provided with a pair of openings 21 therein to permit of inserting the eggs within the casing and of removing them therefrom.

I provide also a bottom wall 23 which may have a pair of openings 25 therein registering vertically with the openings 21 and it is to be noted

2 that the openings 25 are normally closed by a cup-shaped closure member 27.

I provide further a bottom frame 29 which may be made of either metal or of a plastic material as may be desired. I prefer to use some cold pressed plastic composition which preferably has heat-insulating characteristics so as to make it possible to do the cooking or baking of eggs in the device on the ordinary breakfast table.

I provide a pair of knobs 31 at the two side walls 15 and 17 of the device to permit of carrying the egg baker.

I have elected to show my improved device as being designed and constructed for simultaneously baking two eggs if desired and I have therefore shown two cylindrically tubular members 33 which have a relatively large number of perforations 35 therein. The two tubular members 33 may be held at their upper ends by in or downturned flanges, these flanges being a part of top member 19, while the lower edge portions thereof may be held in proper operative positions by the heads of small clamping rivets 39 which may be used to hold the closure 27 in proper operative position relative to the base plate 23.

I provide an electric heating element 41 for each of the two tubular members 33 and I have obtained good results in the use of my device when the resistor wire comprising the heating element 41 was wound in the shape of a long spiral coil, of small diameter, which coil was supported on refractory electric-insulating members 43 secured to the tubular members 33 as by suitable machine screws 45. Reference to Figs. 4 and 5 of the drawings will show that the heating elements 41 extend to substantially the bottom edge of tubular members 33 and to almost the upper end of tubular members 33 and that the distribution around the tubular members, in a horizontal plane, is such that the temperature around the periphery of the tubular members 33 will be substantially uniform.

Reference to Fig. 4 of the drawings will show also that the tubular members 33 are initially partly open or are incomplete in a horizontal plane, and that they are secured together by a vertically-extending metal plate 47 which has a vertical central slot 49 therein for a purpose which will hereinafter appear.

A plurality of contact terminals 51 are provided at the front side of the two tubular members 33, mounted on small plates 53 of electric-insulating material which latter plates may be suitably secured in any desired manner on or against the upper face of base plate 23. I provide a rear plate 54 of electric-insulating material having thereon a plurality of terminal members 55, 56, 57 and 59 (see Fig. 4) to permit of energizing the heating elements through a twin conductor cord 61 all as now well known in the art.

Means for holding two eggs in the tubular members 33 comprises a pair of annular members 63, each having a plurality of enlarged annular members 65, three in number, thereon and each of the members 63 has a lug or projection 67 thereon extending toward each other to permit of supporting the two annular or ring-like members 63 from a pair of vertically extending bars 69, the upper ends of which are suitably fixedly secured to a handle bar 71. This handle is of substantially L-shape and has a heat-insulating member 73 secured thereto. The lugs 67 may be integral with each other and as has already been stated are secured to the two spaced bars 69 at the lower ends thereof so as to permit of moving the egg holding members 63 to substantially the position shown in Fig. 5 of the drawings. It will be noted that that part of the extension 67 located between the bars 69 will enter the slot 49 to limit the downward movement of the egg holder comprising members 63, 65, 67, 69, 71 and 73, to such position that the egg or eggs will be supported at substantially the middle or central portion of one or of each of the tubular members 33. The lower end portion of handle strip 71, namely that part secured to the upper end portions of bar 69 will also enter the slot 49 and will hold the egg supports in desired proper operative positions as has already been hereinbefore stated.

I have found it desirable to provide a heating means for my improved egg baker the wattage of which is not too high, since I have found that an operating temperature within the perforated tubular members 33 on the order of 400° Fahrenheit will permit of cooking or baking an egg or eggs to any desired degree from the ordinary "soft" to "hard," while meeting the desired condition of substantial uniformity of baking of the egg.

In order to limit the temperature I provide: a bi-metal bar 75 which bar is fixedly secured to a lug or projection 77 which lug may be held against one of the tubular members 33 by a machine screw 79 (see Fig. 5). A pair of contact arms 81 and 83 are insulatedly supported by lug 77 and are so designed and constructed that contact arm 81 is a resilient arm having a contact member thereon normally in engagement with a cooperating contact member on relatively rigid arm 83. Resilient contact arm 81 has mounted thereon an adjustable stop 85 having at its inner end a small lug 87 of electric-insulating material adapted to be engaged by the free end of bi-metal bar 75 which is adapted to move toward lug 87 and away from the tubular member 33, when heated, this movement of bi-metal bar and its engagement with lug 87 will cause contact arm 81 to be moved out of engagement with contact member on arm 83 thus interrupting the energizing circuit of the heating element 41, which circuit is again established on the cooling of bi-metal bar 75.

I have found that an egg can be baked to the usual "hard" condition in about twelve minutes when the temperature obtained in the tubular member or members is on the order of 400° Fahrenheit and that a "soft" egg is obtained when baking is continued for from six to eight minutes.

I provide a thermal timer comprising a bi-metal bar 89 fixedly supported at one of its ends as by a depending lug 91 of a small plate 93 which may be secured against base plate 23 as by one or more short machine screws 95.

The bi-metal bar 89 has operatively associated therewith and insulatedly mounted thereon a small resistor coil and heater 97.

The free end of the bi-metal bar 89 is adapted to flex or move upwardly when heated and has mounted thereon a laterally extending lug 99 which lug is adapted to extend into an opening 101 provided adjacent to the lower end of a vertically movable bar 103. The upper end of bar 103 has an extended slot 105 therein through which extends a headed pin 107 which pin is fixedly held adjacent to the upper end of a plate 109. Plate 109 may also be held by the machine screws 95.

The lower end of bar 103 may be guided by a slot provided for such purpose in a forwardly extending flange portion 111 of plate 109, as well as a registering slot in a plate 112.

I provide a normally closed switch for controlling the energization of the heater 97 and this switch comprises a relatively rigid contact arm 113 and a resilient contact arm 115 these two arms being insulatedly mounted on a substantially vertically extending member 117, which may be a part of plate 93.

The contact arm 115 is normally biased into engagement with arm 113 and has fixedly secured thereto at its outer end a lug 119 of electric-insulating material. An arm 121 is pivotally mounted as by a pin 123 on plate 109 and has a recess 125 at its outer or left hand end within which end projects the electric insulating lug 119. An over center spring 127 has one end connected to a pin on bar 103 while its other end is connected to a pin on the left hand end portion of switch-actuating arm 121. The operative position of bar 103 when it has been moved upwardly by heating and consequent flexing of bi-metal bar 89 is shown in Fig. 7 by the broken lines of these respective parts, the pin on bar 103 having connected therewith the right hand end of spring 127 then having been moved vertically upwardly to a position above the fixed pivot pin 123 with the result that arm 121 will be moved to the position shown by the broken lines in Fig. 7 of the drawings and against a small stop lug 129 which may be a part of plate 109. This movement allows the lower wall of slot 125 in the outer end of arm 121 to engage lug 119 on contact arm 115 and to lift this arm 115 upward to cause a quick break of contact arm 115 from contact arm 113.

Since the lug 99 on bi-metal bar 89 is extended into opening 101 in bar 103, upon cooling of the bi-metal bar 89 attendant upon breaking the engagement between contact arm 115 and contact arm 113 as has hereinbefore been described, bi-metal bar 89 upon cooling will move bar 103 downwardly until the contact arm actuated bar 121 will have been moved again to substantially the position shown by the full lines of Fig. 7 whereupon the circuit of heating element 97 will again be closed with consequent heating and upward flexing of bi-metal bar 89, as has hereinbefore been described.

A main switch for controlling the energization of the resistor or heating elements 41 includes a relatively rigid contact arm 130 and a resilient contact arm 131 which are insulatedly secured to a lug 133 which may be a part of plate 109. Resilient contact arm 131 has mounted on its free end a lug 134, of electric-insulating material, which latter is adapted to be engaged by the right hand end of a ratchet bar 135, when the ratchet bar has been moved to its extreme right hand position substantially as shown in Fig. 7 of the drawings. Ratchet bar 135 is provided with two elongated slots 137 and 139 which are adapted to have extend therethrough two support and guide pins 141 and 143. These two pins are individually supported by upstanding lugs 145 and 147 which may be integral with plate 112.

Ratchet bar 135 is adapted to be yieldingly biased in or toward a left hand direction (as seen in Fig. 7) by a spring 149 which has its left hand end connected to a pin secured in extension 117.

A double arm pawl 151 is pivotally mounted intermediate its ends on a pivot pin 153 which pivot pin is fixedly supported by plate 109. The right hand end portion of the double arm pawl 151 is held in engagement in one of a plurality of ratchet teeth recesses by a small spring 155. The left hand arm of pawl 151 has a pin 157 extending laterally thereof for a purpose to be hereinafter set forth.

Means for causing step-by-step movement of ratchet bar 135 in a right hand direction includes a second pawl 159 pivotally mounted on an arm 161 which arm extends in a substantially vertical position and has its lower end pivotally mounted on a pin 163 (see Fig. 5). Bar 103 is provided with a slot 165 therein which has two angularly related portions as will be noted by reference to Fig. 7 of the drawings. A pin 167 fixed at the left hand end of pawl 159 fits in slot 165 so that when bar 103 is moved vertically upwardly the pawl 159 is first caused to turn in a clockwise direction to have its right hand end engage one of the recesses of ratchet bar 135 and thereafter to cause movement, in a right hand direction, of ratchet bar 135 and it will be noted that the right hand end of pawl 151 will prevent immediate returning movement of the ratchet bar 135.

Means for permitting of adjusting the starting position of ratchet bar 135 includes a rack bar 168 which is adjustable by means of a pinion 169 which may be mounted on pin or stub shaft 143. Reference to Fig. 5 of the drawings will show that pin or stub shaft 143 is rotatably supported by plates 109 and 147 and further that an adjusting knob 171 may be fixedly secured to the front end portion of pin 143 and have its front end portion positioned outside of the casing, as will be seen by reference to Figs. 2, 5 and 6.

The rack bar 168 is provided with a small stop lug 173 which fits in an elongated slot 175 provided in the bottom edge of ratchet bar 135. It is evident that turning movement of knob 171 will result in first turning movement of pinion 169 which meshes with the teeth on rack bar 168 to move the stop lug 173 to a predetermined position so that lug 173 will be positioned substantially in accordance with the time required by the timing means to move the ratchet bar 135 from its starting position, where the right hand end wall of recess 175 was in engagement with lug 173, step-by-step toward the right until it is moved into its final position as shown in Fig. 7 of the drawings with attendant disengagement of contact arms 131 and 129. It will be noted that interruption of the energizing circuit for the heating coils 41 also caused deenergization of the resistor or heating coil 97 for bi-metal bar 89 of the timing means.

In order to start operation of the heater I provide an arm 177 fixedly mounted on pin 141 which pin has an actuating knob 179 secured thereto outside of the casing. Arm 177 is adapted to engage pin 157, when knob 179 is turned in a clockwise direction, with the result that the right hand pointed end of pawl 151 is disengaged from one of the ratchet teeth of ratchet bar 135 with the result that spring 149 will move the ratchet bar 135 in a left hand direction (as seen in Fig. 7). It is evident that if the rack bar 168 has been moved toward the left, spring 149 will cause movement of the ratchet bar 135 in a left hand direction so that it will require a longer time to cause sufficient movement of the ratchet bar 135 by the thermal timing means before the energizing circuit of the main end of the timer heater will be finally opened. When the device embodying my invention has been used it is preferably left without any turning movement of knob 179 in a clockwise direction so that it is possible to plug in the twin conductor cord 61 without immediate energization of the heating elements 41 and of the heating resistor 97.

In order to show the operative condition of the egg baker I may provide a lamp bulb 181 which is connected in parallel with the main heating resistors 41 and which may be seen through an opening 183 which may have a transparent plate 185 to close it all in a manner now well known in the art.

It is obvious that the device embodying my invention provides an electrically heated means for dry cooking an egg or to bake the same. I have found it highly desirable to provide the small annular members 65 on the rings 63 in order to limit the area of the points of support of an egg to thereby insure substantially uniform cooking or baking of an egg in my improved device.

I have found further that the numerous perforations 35 in the tubular members 33 are effective in insuring substantially uniform cooking or baking of eggs cooked or baked in my device.

My improved device provides means for insuring that the maximum operating temperature provided by the electric heating means 41 shall be substantially the same irrespective of the voltage of the supply circuit to which the main heating elements may be connected so that once a scale 187 has been provided for timer adjusting knob 171, substantially the same amount of time will be required irrespective of the voltage of the energizing circuit. In order to point out the range of voltage which can be used to energize the heating elements of a device designed and constructed as hereinbefore described and embodying my invention I may mention that the supply circuit voltages while normally being on the order of 115 volts may be as high as 125 volts or as low as 100 volts. I have found that substantially the same degree of cooking for any given operating time of the hereinbefore described thermal timer, will be obtained.

Various modifications may be made in the device embodying my invention without departing from the spirit and scope thereof and all such modifications as are included by the appended claim are to be considered as being covered thereby.

I claim as my invention:

An egg baker comprising a casing having a pair of top openings, a pair of vertical-walled adjacent cooking chambers of a diameter slightly larger than egg diameter underlying the pair of top openings and separated by a vertical partition, a vertical slot of shorter length than the partition extending downwardly from the upper end of the partition, a bifurcated member having closely spaced opposite arms projecting downwardly into the respective chambers on opposite sides of the partition and having a bridging portion adapted to be removably supported in the slot in the partition, and egg holders secured to the respective arms of the bifurcated member, and removably supported thereby in the respective chambers spaced from and concentric with the walls of the respective chambers.

JOHN R. GOMERSALL.

REFERENCES CITED

The following references are of record in the file of this patent:

UNITED STATES PATENTS

| Number | Name | Date |
|---|---|---|
| 400,255 | Shuckman | Mar. 26, 1889 |
| 403,446 | Reithoffer | May 14, 1889 |
| 999,257 | Radtke | Aug. 1, 1911 |
| 1,188,734 | Clement | June 27, 1916 |
| 1,272,318 | Rodgers | July 9, 1918 |
| 1,462,105 | Hart | Jan. 17, 1923 |
| 1,734,138 | Lehmann | Nov. 5, 1929 |
| 1,767,802 | Langos | June 24, 1930 |
| 1,971,012 | Macdonaly | Aug. 21, 1934 |
| 2,059,911 | Rebora | Nov. 3, 1936 |
| 2,109,212 | Ehrgott | Feb. 22, 1938 |
| 2,204,699 | Robertson | June 18, 1940 |
| 2,329,927 | Orkfritz | Sept. 21, 1943 |